(12) United States Patent
Hou

(10) Patent No.: US 6,179,072 B1
(45) Date of Patent: Jan. 30, 2001

(54) SUPPLEMENTAL CHARGE FOR HYDROSTATIC STEERING SYSTEM

(75) Inventor: Yifei Raymond Hou, Waterloo, IA (US)

(73) Assignee: Deere & Company, Moline, IL (US)

( * ) Notice: Under 35 U.S.C. 154(b), the term of this patent shall be extended for 0 days.

(21) Appl. No.: 09/417,925

(22) Filed: Oct. 13, 1999

(51) Int. Cl.[7] .................................................. B62D 11/18
(52) U.S. Cl. ...................................................... 180/6.44
(58) Field of Search ........................... 180/6.2, 6.3, 6.44, 180/305, 306, 307

(56) References Cited

U.S. PATENT DOCUMENTS

| | | | |
|---|---|---|---|
| 4,649,705 | * | 3/1987 | Williamson ........................ 680/420 |
| 4,955,442 | * | 9/1990 | Crabb et al. ........................ 180/6.44 |
| 5,390,751 | | 2/1995 | Puetz et al. . |
| 5,948,029 | | 9/1999 | Straetker . |
| 6,062,332 | * | 5/2000 | Stephenson et al. ................ 180/305 |

* cited by examiner

*Primary Examiner*—Kevin Hurley

(57) ABSTRACT

A supplemental charge for a hydrostatic steering system is provide by coupling the output of the transmission oil pump to the outlet of the steering charge pump and providing a check valve to prevent oil flow from the transmission oil pump to the steering charge pump unless the charge pump outlet pressure drops below the operating pressure of the transmission pump. When the steering charge pressure does drop below the transmission oil pressure, the check valve opens and oil is provided to the main steering pump by the transmission oil pump. A pressure transducer in the oil line activates a warning signal in the event the check valve is open more than a few minutes to alert the vehicle operator to a system failure.

6 Claims, 1 Drawing Sheet

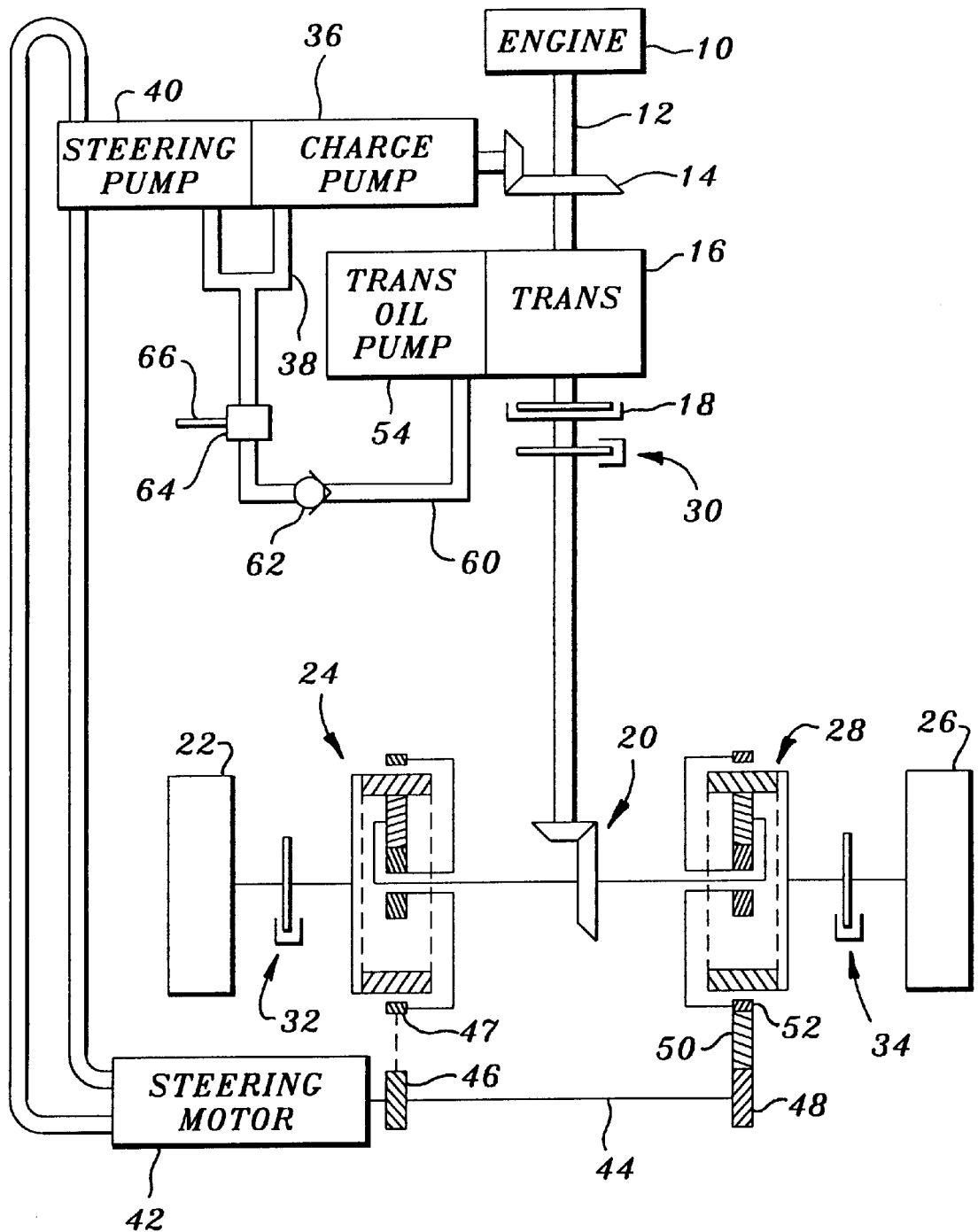

SUPPLEMENTAL CHARGE FOR HYDROSTATIC STEERING SYSTEM

BACKGROUND OF THE INVENTION

1. Field of the Invention

The present invention relates to the hydrostatic steering system for a vehicle and in particular to a supplemental charge for the steering pump.

2. Description of the Related Art

A typical hydrostatic steering system includes a variable displacement pump coupled to a fixed displacement motor. A charge pump provides a constant supply of oil to the main steering pump for controlling the main steering pump and to provide cooled oil to the steering system. Such steering systems are only functional as long as the charge pump and steering pump are operating properly. If the charge pressure drops below a certain level, steering ability will be reduced. Increased steering inputs will be required to achieve a given turn. The stability of steering charge pressure is thus critical to maintaining normal function of the hydrostatic steering system. During low pump speed and high steering load conditions, charge flow may not be sufficient to make up for the oil exchange and the charge pressure would consequently drop. This can occur, for example, when turning a vehicle into or out of a building when high steering input is needed but the engine speed is low. Charge pressure may also be reduced by poor charge pump suction during extremely cold temperature

SUMMARY OF THE INVENTION

Accordingly, it is an object of the present invention to provide a means to supply an appropriate charge pressure in the event the steering charge pressure drops too low.

The present invention provides an oil line connection between an existing transmission oil pump and the outlet of the hydrostatic steering system charge pump.

A check valve prevents oil flow from the steering system to the transmission and prevents oil flow from the transmission oil pump to the steering charge pump unless the charge pump pressure drops below the operating pressure of the transmission pump. When the steering charge pressure drops below the transmission oil pressure, the check valve opens and the transmission oil pump maintains the charge oil pressure at the transmission oil pressure. Transmission oil is provided to the main steering pump. In the event of a permanent loss of charge pressure or a relatively long drop of charge pressure, a pressure transducer in the oil line activates a warning signal to the vehicle operator.

It is an advantage of the present invention that an existing transmission oil pump is used to supplement the steering charge, a dedicated pump is not required, thus reducing cost.

It is a further advantage that in cold conditions, if the transmission oil pressure rises due to increased resistance in the transmission oil cooler, excess pressure can be relieved by opening the check valve and delivering oil to the steering system.

BRIEF DESCRIPTION OF THE DRAWINGS

FIG. 1 is a simplified schematic diagram of a vehicle drive and steering system according to the present invention.

DESCRIPTION OF THE PREFERRED EMBODIMENT

Referring to FIG. 1, a drive train of a tracked vehicle includes an engine 10 with an output shaft 12 that drives a right angle gear 14 and a transmission 16. The transmission 16 drives a clutch 18 which, in turn, drives, via final or right angle drive 20, a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetary drives (not shown), as provided on John Deere 8000 and 9000 tractors, are mounted between the steering planetary drives and the respective drive wheels, but are not further described because they are not involved in the subject matter of this application. A parking brake 30 is coupled to shaft 12, and left and right service brakes 32, 34 are coupled to the left and right drive wheels 22, 26, respectively.

The right angle gear 14 drives a charge pump 36, such as a 20 cc, 90 series pump made by Sauer-Sundstrand and a variable displacement main steering pump 40, such as a 100 cc, 90 series pump made by Sauer-Sundstrand. The charge pump 36 provides a constant supply of oil to the main steering pump 40. The output 38 of the charge pump is shown externally for purposes of describing the present invention but will typically be an internal connection between the charge and main steering pumps. The charge pump outlet is coupled to the main steering pump inlet. The main steering pump 40, in turn, powers a hydraulic fixed displacement steering motor 42, such as a 100 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 28.

The swashplate (not shown) of main steering pump 40 is controlled by a pressure controlled pilot valve or electronic displacement control (not shown) based on various inputs, including a steering wheel rotational position. Additional detail of the steering control is provided in U.S. Pat. No. 5,948,029 to Straetker, and assigned to the assignee of this application.

The transmission 16 includes an integral transmission oil pump 54. The pump 54 provides oil circulation to lubricate and control the transmission and cool the wet-disc clutch. In a typical application, the oil pressure produced by the transmission oil pump is less than the oil pressure produced by the charge pump 36. An oil line 60 connects the outlet of the transmission oil pump 54 to the steering charge pump outlet line 38. A check valve 62 in the oil line 60 prevents oil flow from the transmission pump to the charge pump outlet when the charge pump pressure is greater than the transmission pump pressure. However, in the event of a charge pump pressure drops too low or is permanently lost, the check valve 62 will open, providing charge oil to the main steering pump 40 at the transmission oil pressure. The check valve also prevents oil flow from the steering charge pump to the transmission.

In an exemplary embodiment, the steering charge and the transmission system pressures are set at 2400 kPa and 1700 kPa, respectively, for normal operating mode. There is no oil flowing through the connection between the transmission oil pump and steering pumps and, therefore, the transmission system operating condition will not be affected by the addition of this circuit. If the steering charge pressure drops below 1700 kPa, the check valve 62 will open and the steering charge pressure will be maintained at 1700 kPa as supplied by the transmission. The steering system can functionally operate below 1700 kPa without causing a secondary failure in the main steering pump 40 or steering motor 42. If steering charge pressure continuously operates at 1700 kPa for several minutes, a charge pressure transducer 64 will activate a warning signal to the vehicle operator via a wire 66.

The supplemental charge circuit ensures that sufficient steering charge pressure is maintained as long as the transmission is functional. Steering capability is not needed if the transmission is not functional and the vehicle can no longer move. The supplemental charge circuit boosts steering charge pressure and guarantees immediate steering capability during cold start. The supplemental charge circuit makes low steering charge pressure early warning possible during an oil leak. The supplemental charge circuit thus improves reliability of the steering system.

The transmission oil pump is an existing pump. Thus the addition of the supplemental charge does not add a new pump or require a pump that is only used for supplementing the charge pump. The supplemental charge is thus provided at a relatively low cost.

The invention is not limited to use of a transmission oil pump to supply the supplemental charge pressure. Other existing hydraulic systems on the vehicle, if any, could be used to supply the supplemental charge pressure. The only requirements are that the other hydraulic system have a continuous supply of oil at a suitable pressure below the normal steering charge pressure and above the minimum required charge pressure.

The invention should not be limited to the above-described embodiments, but should be limited solely by the claims that follow.

I claim:

1. In a vehicle having a hydrostatic steering system including a main steering pump having an outlet, a charge pump having an outlet to provide a constant supply of oil to the main steering pump and a steering motor that receives oil from the main steering pump to control the direction of travel of the vehicle, the vehicle further having a transmission and a transmission oil pump with an outlet, the improvement comprising an oil line coupling the transmission oil pump outlet with the charge pump outlet and a check valve in the oil line operable to open and allow oil flow from the transmission pump to the steering pump if the charge pressure drops below the transmission oil pressure whereby the charge pressure is maintained at the transmission oil pressure.

2. The vehicle as defined by claim 1 further comprising a pressure switch connected to the oil line to actuate a signal in the event the oil pressure in the oil line drops to the transmission oil pressure level for a predetermined length of time.

3. A vehicle comprising:

an engine;

a transmission driven by the engine and drive wheels driven by the transmission, the transmission including a transmission oil pump having a pump outlet;

a hydrostatic steering system for controlling the direction of travel of the vehicle, the steering system including a hydraulic main steering pump and steering motor and a charge pump having an outlet coupled to the main steering pump for providing a constant supply of oil to the main steering pump;

an oil line coupling the transmission oil pump outlet with the charge pump outlet, the oil line including a check valve to limit the direction of oil flow from the transmission oil pump to the main steering pump and the check valve only opening to allow oil flow only when the charge pump outlet pressure drops to a value lower than the transmission oil pump outlet pressure.

4. The vehicle as defined by claim 3 further comprising a pressure transducer coupled to the charge pump outlet to monitor the charge pressure and provide a signal to an operator if the charge pressure drops below a predetermined value.

5. In a vehicle having a hydrostatic steering system including a main steering pump having an outlet, a charge pump having an outlet to provide a constant supply of oil to the main steering pump and a steering motor that receives oil from the main steering pump to control the direction of travel of the vehicle, the vehicle further having another hydraulic system including a second pump with an outlet, the improvement comprising an oil line coupling the second pump outlet with the charge pump outlet and a check valve in the oil line operable to open and allow oil flow from the second pump to the main steering pump if the charge pressure drops below the oil pressure of the second pump whereby the charge pressure is maintained at the second pump oil pressure.

6. The vehicle as defined by claim 5 further comprising a pressure switch connected to the oil line to actuate a signal in the event the oil pressure in the oil line drops to the second pump oil pressure level for a predetermined length of time.

* * * * *